Patented June 12, 1928.

1,673,735

UNITED STATES PATENT OFFICE.

ROBERT L. CORBY, OF NEW YORK, AND WILHELM H. F. BÜHRIG, OF MOUNT VERNON, NEW YORK, ASSIGNORS TO THE FLEISCHMANN COMPANY, OF NEW YORK, N. Y., A CORPORATION OF OHIO.

PROCESS FOR THE MANUFACTURE OF YEAST.

No Drawing.     Application filed August 16, 1924. Serial No. 732,567.

This invention relates to a process for the manufacture of yeast, especially baker's yeast, and more particularly to an improved method of carrying out a process of manufacturing yeast in which at least a portion of the yeast nutrient is added after the propagation of yeast has begun.

An object of this invention is to provide an improved procedure for the manufacture of yeast in an efficient, convenient and economical manner.

In its more specific aspects one of the objects of this invention is to provide a method of carrying out a process of manufacturing yeast in which the amounts of the added constituents are regulated in such a manner that the capacity of fermenters and other propagating apparatus is materially increased and large yields of yeast are obtained.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

In the art of yeast manufacture there has been a constant endeavor to obtain a yeast having better baking qualities and at the same time to increase the quantity of yeast which may be obtained from a given amount of materials and thereby decrease the net production cost.

Nutrient solutions for the propagation of yeast may be of a type prepared from all cereal material, from sugar material, together with suitable yeast nourishing inorganic compounds such, for example, as compounds containing yeast-assimilable nitrogen and phosphorus adapted to be utilized during yeast growth, or from a combination of the materials of these two types of nutrient solutions. The amount of yeast to be obtained by propagation in any of the above types of nutrient solutions is somewhat dependent upon the environment prevailing in the propagating vat or fermenter, which environment involves various factors such as the amount of aeration, the temperature and the density of the nutrient solution.

In the prior practice of yeast propagation, particularly in nutrient solutions containing sugar material and yeast-nutrient inorganic compounds, that is, a solution of the "sugar-salt" type, the control of the environment has been carried to a comparatively high order and fluctuations in the acidity of the solution were carefully minimized, suitable corrective agents being added whenever the desired limits were exceeded. For example, ammonium hydroxide has been used as an agent to depress undue acidity, particularly released acidity, while a suitable acid of an organic or inorganic nature, such as for example phosphoric, sulphuric or lactic acid has been used when necessary to maintain the acidity.

In order adequately to control the temperature it has been customary to provide the fermenter with a suitable cooling means, for example, an interiorly disposed cooling coil. During a portion of the propagation there may be a tendency for the temperature to rise in the fermenter. In consequence a gradually increasing circulation of the cooling medium in the cooling coil was generally practiced.

The condition of the nutrient solution has thus been controlled by making suitable readings at regular intervals and by employing when necessary suitable corrective measures, as the conditions indicate.

A nutrient solution of relatively high dilution, especially in the use of the so-called sugar-salt type of solutions, has been found to be preferable, such dilution having been attained either by initial dilution of the entire nutrient solution or by suspending the seed yeast in a diluted portion thereof or other aqueous liquid non-toxic to yeast and slowly and substantially continuously adding the remaining and more concentrated solution. Such last mentioned type of process is known alternately as a "continuous", an "addition", or a "continuous addition" process. In either case, since the entire amount of the dilute nutrient solution is present in the fermenter at the end of the process, relatively large fermenters have been required in order to obtain a given yield of yeast.

In the practice of the present invention, an environment is created and substantially maintained which is favorable to the propagation of large yields of yeast, at the same time using smaller apparatus than was heretofore possible with the use of the very dilute nutrient solutions now generally deemed preferable. This is achieved by the use of a fermenter, in which propagation is started, containing initially only a portion of the nutrient material from which a given batch of yeast is to be manufactured. During the period of propagation further nutrient material is added in a manner conducive to the prolific multiplication of yeast in the fermenter, as more fully set forth hereinafter.

To this end the nutrient solution is first prepared in a relatively concentrated condition. In case all the nutrient material is not contained initially in the prepared solution, supplemental nutrient material may be added, some to the portion first placed in the fermenter and the balance during the supplying of the solution run in during the course of propagation. The nutrients to be added thus may if desired be in solution.

In the preparation of the nutrient solution it should be the object to bring it to a condition favorable to yeast propagation. In the case of solutions of the sugar-salt type, this involves particularly the treatment of the sugar material in a manner so as to remove as far as practicable, all foreign material which may have a deleterious influence upon the yeast. For example, where molasses is the sugar material to be employed, this preliminary treatment is preferably such as to produce a clear, rapidly filtering solution giving a clear filtrate. Such treatment may comprise any suitable method and may involve heating, filtering and the addition of one or more clarifying agents.

A portion of the nutrient solution when prepared is placed in the fermenter and a properly tempered diluent, for example, water, both hot and cold, run in until the dilution, temperature and density are brought initially to the points adapted for the prolific multiplication of yeast after which the fermenter is preferably stocked with a relatively large amount of suitable seed yeast. The balance of the prepared solution which is in a relatively concentrated condition is placed in a supply reservoir so that it can be run into the fermenter during the period of propagation in such quantities and at such times as desired, the solution in the fermenter being continuously aerated during substantially the whole of such period.

Prolific propagation of yeast is here induced throughout the propagating period by regulating the addition of nutrients to the fermenter in such a manner as highly to stimulate the propagation of yeast without unduly raising the concentrations of the nutrient materials in solution at any time to a point which tends to become toxic to the yeast. The rate here practiced, however, is substantially in excess of that heretofore possible because of the stimulated activity of yeast. A materially increased activity of the yeast is attained at the beginning by the employment of temperature conditions within the fermenter which have heretofore been deemed impracticable. In the heretofore known processes of manufacturing yeast, the fermenter has been stocked while the fermenter is being filled and somewhat before the final dilution has been attained, and at a temperature of from 22°–25° C., and during the first few hours of the propagation the temperature has been allowed gradually to rise to a maximum of 30° C. In the present process, however, the temperature initially employed during a portion of at least one of the stages of propagation is much higher than heretofore and may be for example from 30°–35° C. or even up to the thermal death point of the yeast in a sugar solution. Moreover, contrary to the usual practice, this temperature is gradually lowered during the first hours of the stage of propagation until a temperature of 30° C. has been reached and is thereafter maintained approximately constant, the interval of time during which the high temperature is maintained being inversely proportional to the temperature.

As the propagation progresses, the presence in the nutrient solution both of the yeast cells themselves and the residual substances in the nutrient solution, either of an unassimilated or eliminated character, tend to increase the density and the toxicity generally prevailing in the nutrient solutions, whereas the relative concentrations of the nutrients present may or may not have changed. As propagation is here instituted under conditions particularly favorable to large yields of yeast, certain of the starting conditions are, in accordance with the practice of this invention, periodically approximately restored at intervals whenever such undesirable conditions are reached. For example, fluctuation in the acidity may be compensated from hour to hour by the addition of suitable antacid reagents, particularly those containing yeast assimilable nitrogen, and at intervals generally of several hours, "addition" is diminished or stopped, a substantial portion of the content of the fermenter is withdrawn and thereafter water, both warm and cold, is again added to the fermenter until certain of the starting conditions, particularly dilution, are substantially restored.

As the fermenter is not completely drained, there remains, of course, a very substantial amount of yeast in the fermenter which serves as seed yeast for the next succeeding stage of the propagation. Furthermore, if desired, in order to increase the amount of seed yeast present, a portion of the yeast separated or pressed from the preceding stage may be added at the beginning of any subsequent stage. The total period of propagation practiced in this way may continue for from 12 to 24 or more hours. The interval at which yeast is to be drawn off, will, of course, preferably be some sub-multiple of the total period of propagation, such as for example, from 4 to 6 or 8 hours as conditions warrant.

It will be perceived that by this intermittent drawing off, fermenters of less total capacity may be employed than was heretofore possible, for a given yield of yeast. The reservoir, however, is preferably proportioned to contain the nutrient which is to be supplied during each stage of the propagating period. It will also be perceived that since the reserve reservoir contains the nutrient for the regulated additions in a relatively concentrated form, that less space is occupied by the main mass than would be required if it were diluted in toto in a fermenter. This process therefore includes the regulated supplying of further nutrient from an outside source to a fermenter and at suitable intervals drawing off yeast preferably accompanied by temporary diminution or cessation of "addition". Yeast is separated from the withdrawn solution cooled and ultimately pressed in the usual manner. Large yields of yeast, for example, yields approximating 85% and over, based on the sugar material employed, (assuming such sugar material to contain 50% fermentable sugars) may be obtained in the practice of this process. By the utilization of the principles set forth a greater amount of yeast may be produced from a given amount of material in a given time than was heretofore practical. The following is an example of the manner in which the process of this invention may be practiced:

The desired quantity of sugar material such as molasses of any suitable type for example, cane or beet molasses or a mixture thereof is treated in any suitable manner so as to yield a clear, rapidly filtering solution. A suitable treatment is for example one in which the molasses is clarified by the use of commercial calcium acid phosphate, ("super-phosphate") with or without the addition of a small amount of ammonia, the mixture being heated moderately. For example, a batch of 10,000 pounds of molasses may be diluted slightly, and, if desired, compounds of ammonia added thereto, the temperature raised to 60°–70° C., and about 1000 pounds of super-phosphate added, whereupon the mixture may be filtered through a suitable filter preferably with the accompanying use of "filter-cel" or the like. The resulting solution will have an acidity of about 5° or over (calculated as the number of cc. of normal soda necessary to neutralize 100 cc. thereof), and a concentration of about 15° to 20° Balling, such concentrations of the prepared nutrient solution will hereafter be referred to by the term "relatively concentrated".

A suitable portion of this prepared solution, for example up to about 15%, is run directly into the fermenter while the balance is pumped to a supply reservoir. Enough suitably tempered water is added to the fermenter to obtain a density of approximately 1°–2° Balling and a temperature of approximately 33° C., the acidity being adjusted if necessary to a suitable concentration such as, for example, 0.6°. A few minutes prior to the time at which the final dilution is reached, the seed yeast is added, preferably to an amount of from 20–27%, based on the sugar material (on the basis of 50% fermentable sugars) to be used during the first stage of propagation. The nutrient solution having been prepared and stocked, propagation is instituted with fairly high aeration, the temperature being slowly lowered until at about the end of the fourth hour it has reached about 30° C. and is thereafter maintained approximately constant, at least throughout any given stage of propagation.

During the period of propagation, the reserve nutrient solution is slowly and substantially continuously added in amounts such that the density is maintained substantially constant, such amounts being larger than those heretofore deemed practical and varying from hour to hour from approximately 2% up to 10%. Toward the end of and between each stage of the total period of propagation such "addition" is either largely diminished or entirely suspended in order to obtain a full utilization of the nutrient materials. For example, in a total fermentation time of 14 hours, no addition is made during the seventh hour or during the last hour and the rate of addition is considerably diminished during the sixth hour. Moreover, between the stages of the propagation period, for example, during the seventh hour while the "addition" has ceased, aeration is diminished and the yeast containing solution is withdrawn from the fermenter until for example about 10–70% of the quantity present at the end of the preceding hour remains, the withdrawal being regulated in accordance with the salt concentration of the liquid in the fermenter. The yeast containing solution thus withdrawn may be immediately separated and is desired a portion of the separated yeast may be returned to the fermenter to act as seed yeast for the next succeeding stage or if desired the withdrawn solution may be used in a subsequent stage of propagation in a manner similar to the use of the residue in the fermenter. After such withdrawal sufficient water, both cold and hot, is added to the fermenter to maintain the temperature substantially constant, and again to bring the content of the fermenter up to approximately the initial volume of the diluted portion, whereupon "addition" and higher aeration are resumed.

When necessary either at the beginning of any stage of propagation or from hour to hour during the process, accompanying the additions from the storage reservoir, there is added to the fermenter supplemental nutrient materials adapted to regulate the acidity of the solution and to supply for example, yeast-assimilable nitrogen, preferably in the form of ammonium compounds. This may be accomplished by the selective addition of suitable ammonium compounds of an organic or inorganic nature, such as for example, aqua ammonia, ammonium carbonate, ammonium sulphate, ammonium phosphate, ammonium lactate and the like, it being desirable to maintain the acidity throughout the process approximately constant and to have present at the beginning of each stage of propagation a nitrogen concentration of approximately 0.06%, the concentration of the latter substance being allowed to fall gradually during each stage of the propagation in order to insure an efficient utilization thereof. For example, in the above described process there are added during each stage of the propagation a total of approximately 160 liters of aqua ammonia and 90 pounds of ammonium sulphate. Also regulated amounts of a suitable acid may be added if, and when necessary. In one aspect, therefore, the process may be considered as comprising the preparation of a yeast nutrient solution, the initiating of propagation of yeast with aeration in a diluted portion thereof, slowly and substantially continuously adding thereto yeast-nutrient materials to supply the deficiencies of the solution and including material to control the acidity, periodically concurrently diminishing or interrupting the addition of nutrients, lowering the aeration and withdrawing a portion of the yeast containing liquid, and thereafter diluting the residue thereof with suitably tempered water and then continuing the propagation with resumption of higher aeration and addition of nutrients.

By the use of the process, a total yield of yeast of approximately 85% and over (calculated on the basis of raw materials containing 50% fermentable sugars) may be obtained, such yeast having very desirable properties in that it presses well, is of a light color, and has good keeping qualities and excellent baking strength.

It will be observed that in carrying out the above process, a more efficient utilization of the apparatus is attained, in that at least double quantities of materials can be passed through a fermenter in a given time with a consequent saving in the amount of air and other ancillary materials and apparatus used for the propagation of yeast, while at the same time increasing the yield and quality of the yeast produced.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A process of manufacturing yeast by propagation with aeration, which comprises suspending seed yeast in a non-toxic liquid, aerating the liquid, adding yeast nutrients to the liquid in regulated amounts during the propagating period, periodically withdrawing a portion of the yeast containing liquid, diluting the residue thereof and then continuing the propagation therein with addition of nutrients.

2. A process of manufacturing yeast by propagation with aeration, which comprises suspending seed yeast in a non-toxic aqueous liquid, aerating the liquid, adding yeast nutrients to the liquid in regulated amounts during the propagating period, periodically concurrently diminishing the addition of nutrients, lowering the aeration, and withdrawing a portion of the yeast containing liquid and thereafter diluting the residue thereof and continuing the propagation therein with resumption of higher aeration and addition of nutrients.

3. A process of manufacturing yeast by propagation with aeration, which comprises suspending seed yeast in a non-toxic aqueous liquid, aerating the liquid, adding yeast nutrients to the liquid in regulated amounts during the propagating period, periodically withdrawing a portion of the yeast containing liquid, diluting the residue thereof and continuing the propagation therein with addition of nutrients, the temperature of the liquid in which the seed yeast is suspended and the temperature maintained during the first few hours only of a period of propagation being above 30° C.

4. A process of manufacturing yeast by propagation with aeration, which comprises suspending seed yeast in a non-toxic aqueous liquid, aerating the liquid, adding yeast nutrients to the liquid in regulated amounts during the propagating period, periodically concurrently diminishing the addition of nutrients, lowering the aeration, and withdrawing a portion of the yeast containing liquid, and thereafter diluting the residue thereof and continuing the propagation therein with resumption of higher aeration and addition of nutrients, the temperature of the liquid in which the seed yeast is suspended and the temperature maintained during a portion of the period of propagation being above 30° C.

5. A process of manufacturing yeast, which comprises starting propagation with a suspension of seed yeast in a fermenter partially filled with a non-toxic aqueous liquid, aerating the liquid, adding yeast nutrients to the liquid in regulated amounts, during the propagating period, periodically withdrawing a portion of the yeast containing liquid, diluting the residue thereof to approximately the volume of the liquid initially in the fermenter and then continuing the propagation therein with the accompanying addition of yeast nutrients.

6. A process of manufacturing yeast, which comprises starting propagation with a suspension of seed yeast in a fermenter partially filled with a dilute nutrient solution, aerating the solution, adding yeast nutrients to the solution in regulated amounts during the propagating period and periodically restoring the starting conditions in the fermenter by withdrawing a portion of the yeast containing liquid and diluting the remainder thereof.

7. A process of manufacturing yeast, which comprises starting propagation with a suspension of seed yeast in a fermenter partially filled with a dilute nutrient solution, aerating the solution, adding yeast nutrients to the solution in regulated amounts during the propagating period, periodically concurrently diminishing the addition of nutrients, lowering the aeration and withdrawing a portion of the yeast containing liquid, and thereafter approximately restoring the starting conditions in the fermenter by diluting the remainder of the yeast containing liquid with water and continuing the propagation therein with increased aeration and addition of nutrients.

8. A process of manufacturing yeast, which comprises starting propagation with a suspension of seed yeast in a fermenter partially filled with a dilute nutrient solution, aerating the solution, adding yeast nutrients to the solution in regulated amounts during the propagating period and periodically restoring certain of the starting conditions in the fermenter by withdrawing a portion of the yeast containing liquid and diluting the remainder thereof, the temperature of the liquid in which the seed yeast is suspended and the temperature maintained during the first few hours only of the period of propagation being in the neighborhood of 33° C.

9. A process of manufacturing yeast, which comprises starting propagation with a suspension of seed yeast in a fermenter partially filled with a dilute nutrient solution, aerating the solution, adding yeast nutrients to the solution in regulated amounts during the propagating period, the temperature of the nutrient solution in the fermenter being maintained for the first few hours only above 30° C., periodically concurrently diminishing the addition of nutrients, lowering the aeration and withdrawing a portion of the yeast containing liquid, and thereafter approximately restoring certain of the starting conditions in the fermenter by diluting the remainder of the yeast containing liquid with water and continuing the propagation therewith increased aeration and addition of nutrients.

10. A process of manufacturing yeast, which comprises preparing a relatively concentrated yeast nutrient solution, initiating propagation of yeast in a fermenter containing a diluted portion of the nutrient solution, aerating the solution, adding the remainder of the concentrated solution to the diluted portion in regulated amounts during the period of propagation, periodically withdrawing a portion of the yeast containing liquid, diluting the residue thereof and then continuing the propagation with the addition of nutrients.

11. A process of manufacturing yeast, which comprises preparing a relatively concentrated yeast nutrient solution, initiating propagation of yeast in a fermenter containing a diluted portion of the nutrient solution, aerating the solution, adding the remainder of the concentrated solution to the diluted portion in regulated amounts during the propagation period, periodically concurrently diminishing the addition of the concentrated solution, lowering the aeration, and withdrawing a portion of the yeast containing liquid, and thereafter diluting the residue thereof and continuing the propagation therein with increased aeration and addition of the concentrated nutrient solution.

12. A process of manufacturing yeast, which comprises preparing a relatively concentrated yeast nutrient solution, initiating propagation of yeast in a fermenter containing a diluted portion of the nutrient solution, aerating the solution, adding to the solution during the period of propagation and in regulated amounts, yeast nutrients including the remainder of the concentrated solution, periodically concurrently diminishing the addition of nutrients, lowering the aeration, and withdrawing a portion of the yeast containing liquid, and thereafter diluting the residue thereof and continuing the propagation therein with resumption of higher aeration and addition of nutrients.

13. A process of manufacturing yeast, which comprises preparing a yeast nutrient solution including substantial amounts of sugar material and yeast-nutrient salts, initiating propagation of yeast in a fermenter containing a diluted portion of the nutrient solution, aerating the solution, adding to the diluted solution during the period of propagation and in regulated amounts the remainder of the concentrated solution together with other yeast nutrients, periodically withdrawing a portion of yeast containing liquid, diluting the residue thereof and then continuing the propagation therein with increased aeration and addition of nutrients.

14. A process of manufacturing yeast, which comprises preparing a yeast-nutrient solution including substantial amounts of sugar material and yeast nutrient salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance, periodically withdrawing a portion of the yeast containing liquid, diluting the residue thereof and then continuing the propagation therein of increased aeration and addition of nutrients.

15. A process of manufacturing yeast, which comprises preparing a yeast nutrient solution including substantial amounts of sugar material and yeast-nutrient salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance, periodically withdrawing a portion of the yeast containing liquid, diluting the residue thereof and then continuing the propagation therein with increased aeration and addition of nutrients, the temperature of the diluted nutrient solution in which the propagation is initiated and the temperature maintained during the first few hours only of a period of propagation being above 30° C.

16. A process of manufacturing yeast, which comprises preparing a yeast nutrient solution including substantial amounts of sugar material and yeast-nutrient inorganic salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance, periodically concurrently diminishing the addition of nutrients, lowering the aeration and withdrawing a portion of the yeast containing liquid, and thereafter diluting the residue thereof and continuing the propagation therein with increased aeration and addition of nutrients.

17. A process of manufacturing yeast, which comprises preparing a yeast nutrient solution including substantial amounts of molasses and yeast-nutrient inorganic salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance, periodically withdrawing a portion of the yeast containing liquid, diluting the residue thereof and then continuing the propagation therein with increased aeration and addition of nutrients.

18. A process of manufacturing yeast, which comprises preparing a yeast nutrient solution including substantial amounts of molasses and yeast-nutrient inorganic salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance containing yeast-assimilable nitrogen, periodically withdrawing a portion of the yeast containing liquid, diluting the residue thereof and then continuing the propagation therein with increased aeration and addition of nutrients.

19. A process of manufacturing yeast, which comprises preparing a yeast nutrient solution including substantial amounts of molasses and yeast-nutrient inorganic salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance, periodically withdrawing a portion of the yeast containing liquid, diluting the residue thereof and then continuing the propagation therein with increased aeration and addition of nutrients, the temperature of the diluted nutrient solution in which the propagation is initiated and the temperature maintained during the first few hours only of a period of propagation being above 30° C.

20. A process of manufacturing yeast, which comprises preparing a yeast nutrient solution including substantial amounts of molasses and yeast-nutrient inorganic salts, initiating propagation of yeast in a fermenter containing a diluted portion of the nutrient solution, aerating the solution, adding to the diluted solution during the period of propagation and in regulated amounts the remainder of the concentrated solution together with other yeast nutrients including an antacid substance containing yeast-assimilable nitrogen, periodically withdrawing a portion of the yeast containing liquid, diluting the residue thereof and then continuing the propagation therein with increased aeration and addition of nutrients, the temperature of the diluted nutrient solution in which the propagation is initiated and the temperature maintained during the first few hours only of a period of propagation being above 30° C.

21. An improved method of carrying on a continuous-addition process of manufacturing yeast by propagation with aeration, which includes periodically interrupting the addition of yeast nutrients, withdrawing a portion of the yeast containing solution, diluting the residue thereof and then continuing the propagation therein with the addition of yeast nutrients.

22. An improved method of carrying on a continuous-addition process of manufacturing yeast by propagation with aeration over a period of at least eight hours, which includes initiating propagation of yeast at a temperature above 30° C., and during the first few hours of the propagation allowing the temperature to fall to below 30° C.

23. An improved method of carrying on a continuous-addition process of manufacturing yeast by propagation with aeration, which includes periodically interrupting the addition of yeast nutrients, withdrawing a portion of the yeast containing liquid, diluting the residue thereof with water and then continuing the propagation therein, the temperature of the yeast containing solution during the first few hours only of at least one of the periodic stages being above 30° C.

24. An improved method of carrying on a continuous-addition process of manufacturing yeast by propagation with aeration, which includes the steps of periodically concurrently diminishing the addition of yeast nutrients, lowering the aeration and withdrawing a portion of the yeast containing liquid, and thereafter diluting the residue thereof and continuing the propagation therein with increased aeration and addition of yeast nutrients.

25. An improved method of carrying on a continuous-addition process of manufacturing yeast by propagation with aeration, which includes the steps of periodically concurrently diminishing the addition of yeast nutrients, lowering the aeration and withdrawing a portion of the yeast containing liquid, and thereafter diluting the residue thereof, and continuing the propagation thereof with increased aeration and addition of nutrients, the temperature of the yeast containing solution during the first few hours only of at least one of the periodic stages being above 30° C.

26. A process of manufacturing yeast by propagation with aeration, which comprises suspending seed yeast in a non-toxic liquid, aerating the liquid, adding yeast nutrients to the liquid in regulated amounts during the propagating period, periodically concurrently diminishing the addition of nutrients, lowering the aeration and withdrawing a portion of the yeast containing liquid, and thereafter diluting the residue thereof, removing yeast from the withdrawn yeast-containing liquid, returning a portion of such yeast to the diluted residue and continuing the propagation therein with increased aeration and addition of nutrients.

27. A process of manufacturing yeast by propagation with aeration, which comprises suspending seed yeast in a non-toxic aqueous liquid, aerating the liquid, adding yeast nutrients to the liquid in regulated amounts during the propagating period, periodically concurrently diminishing the addition of nutrients, lowering the aeration and withdrawing a portion of the yeast containing liquid, and thereafter diluting the residue thereof, continuing the propagation therein with increased aeration and addition of nutrients, and during the period of propagation neutralizing the deleterious excess of acidity by the controlled addition of a suitable antacid substance.

28. An improved method of carrying on a continuous-addition process of manufacturing yeast by propagation with aeration over a period of about eight hours, which includes initiating the propagation of yeast with aeration in a small portion of dilute nutrient solution at a temperature in the neighborhood of 33° C., gradually adding a yeast-nutrient solution thereto, and after a few hours slowly lowering the temperature to below 30° C.

29. An improved method of carrying on a continuous-addition process of manufacturing yeast by propagation with aeration over a period of about eight hours, which includes initiating the propagation of yeast with aeration in a small portion of dilute nutrient solution at a temperature in the neighborhood of 33° C., gradually adding a yeast-nutrient solution thereto, and after a few hours gradually lowering the temperature to below 30° C. and holding it there for the remainder of the propagating period.

30. An improved method of carrying on a continuous-addition process of manufacturing yeast by propagation with aeration over a period of about eight hours, which includes preparing a yeast-nutrient solution including molasses as a sugar material, initiating the propagation of yeast with aeration in a small portion of the nutrient solution diluted with water and at a temperature in the neighborhood of 33° C., gradually adding the prepared nutrient solution during the eight-hour period, and a few hours after the initiation of the propagation gradually lowering the temperature to below 30° C.

In testimony whereof we affix our signatures.

ROBERT L. CORBY.
WILHELM H. F. BÜHRIG.